Patented Nov. 30, 1943

2,335,520

UNITED STATES PATENT OFFICE 2,335,520

CATALYST FOR POLYMERIZING DRYING OILS

Edward A. Lasher, Los Angeles, Calif., assignor to California Flaxseed Products Company, Los Angeles, Calif., a corporation of California No Drawing. Application January 8, 1943, Serial No. 471,757

8 Claims. (Cl. 260—407)

This invention relates to the polymerization of drying oils and particularly to the catalyst used in the process.

Fatty oils used in the protective coating fields such as vegetable and fish oils of the drying and semi-drying types, are polymerized or "heat-bodied" by heating them to high temperatures for many hours, thus increasing the viscosity to any desired point up to a solid or gelled condition. The polymerized oils are commonly called 'heat-bodied" drying oils.

Long heating of fatty oils tends to darken them and to increase the acidity. It is therefore desirable to increase the rate of polymerization, not only to avoid darkening and acid increase, but to increase the amount of "heat-bodied" oil which may be produced from available equipment.

One object of the present invention is to accelerate this polymerization process so that it may be accomplished in shorter time, thereby lessening the discoloration and development of acidity. Another object is to provide a catalyst for this polymerization which does not discolor or otherwise impair the properties of the drying oil. Another object is to provide drying or semi-drying oils having improved bodying properties when heated.

I have discovered that these and other objects may be attained by the use of one of the halogen compounds of iodine, including iodine bromide, iodine mono-chloride, iodine tri-chloride, and iodine fluoride, as a catalyst in the heat-bodying of polymerizable drying fatty oils. Heat-bodied oil of excellent quality is thereby produced in much less time than is required when catalytic agents are not employed. Only a small amount of my catalyst is required, not more than one-half percent on the basis of the oil treated, and usually being about one-tenth percent.

The temperature at which polymerizable fatty oils containing my catalyst may be bodied is approximately the same as that now employed in the commercial process without catalyst, namely, from about 500° to 600° F. The use of my catalyst shortens the time required to produce a given degree of bodying or polymerization, as measured by the viscosity, molecular weight or density, being of the order of one-half of the time required at the same temperature when no catalyst is used.

The catalysts of my invention may be dissolved or dispersed in, or reacted with the oil, at ordinary room temperatures, in the amount necessary to produce the desired heat-bodying effect, and the composition may then be stored and marketed as polymerizable oil, to be heated at a later time by the purchaser or user to effect the desired polymerization. Oils when so prepared are characterized by having improved heat-bodying properties due to the content of less than one-half percent of my catalyst. No deterioration or other deleterious effects have been observed in the oils containing my catalyst after long storage in the usual containers used in the trade.

The following examples will illustrate my invention.

*Example I.*—I mixed one-tenth percent of iodine bromide with refined linseed oil. Upon standing for a few hours, the slight darkening which occurred upon introduction of the catalyst disappeared, and the oil was indistinguishable in appearance from the original oil. Upon subsequently heating this composition in an open vessel after the usual manner of heat-bodying oils, to a temperature of about 570° to 575° F. for ten hours, a heavy-bodied oil of approximately "Z" viscosity on the Gardner-Holdt scale was obtained. This heat-bodied oil was lighter in color, but otherwise equal to the heat-bodied linseed oil from the same lot in which no catalyst was added, and which had been heated twice as long a time, to get the same amount of polymerization and viscosity. The drying time of the oil was not effected by the catalyst.

*Example II.*—In another case under a similar procedure, I used as catalyst one-tenth percent of iodine tri-chloride, with refined linseed oil, and the time required to attain a given degree of polymerization was reduced at least half of that required for the same oil without added catalyst, and the product had no undesirable characteristics for a heat-bodied oil. Because of the ease of manufacturing, and of handling and control, I prefer to use this catalyst. My preferred commercial product consists of refined linseed oil or its equivalent drying oil, containing about one-tenth percent of iodine tri-chloride. This composition is ready for heat-bodying to the desired extent by the user, using any suitable heat-bodying procedure, such as heating to about 580° F. but for a shorter length of time.

*Example III.*—In another case I heated a large batch of refined linseed oil with about one-tenth percent iodine chloride. After the temperature had reached 580° F., the batch was held at this temperature for four and one-half hours, when a viscosity of "Z" on the Gardner-Holdt scale was attained. Upon continued heating at this temperature to a total of eight and one-half hours, a viscosity of "Z-6" was attained. A similar batch on linseed oil without added catalyst reached a "Z" viscosity in six hours and a "Z-6" viscosity in 11 hours, at the temperature of 580° F.

*Example IV.*—In another case, under a similar procedure to that of Example III, I used one-tenth percent by weight of iodine bromide, with refined linseed oil, and produced a product of "Z" viscosity by heating at 580° F. for four and three-quarters hours, and a viscosity of "Z-6" in eight hours. For comparison, the product of heating similar linseed oil without catalyst at 580° F. and a "Z" viscosity after seven hours, and a "Z-6" viscosity after twelve and three-quarters hours.

While I have used linseed oil in my examples as typical of the heat-bodying drying oils, other vegetable and fish oils and mixtures commonly used in the trade as drying oils, may be employed in my process and for my products, and the term "drying oil" used herein and in the claims includes all such oils which are polymerizable or capable of being "heat-bodied" by heating.

The amount of catalyst necessary is of the order of one-tenth percent, but this is not critical, and because of this small proportion, a reasonable excess is not harmful. Because of the relatively high cost of the catalyst, the actual amount to be used is kept as low as possible to attain the desired reduction of time necessary to produce a given polymerization effect.

While I have described my invention by means of several illustrative examples and compositions, I do not wish to be restricted to these, but limit my invention only insofar as required by the state of the prior art, and the spirit of the appended claims.

I claim:

1. A composition consisting of a drying oil and a relatively small amount of an iodine halide, characterized by its rapid rate of polymerization when heated to polymerizing temperatures.

2. A composition consisting of a drying oil and a relatively small amount of iodine bromide, characterized by its rapid rate of polymerization when heated to polymerizing temperatures.

3. A composition consisting of a drying oil and a relatively small amount of iodine monochloride, characterized by its rapid rate of polymerization when heated to polymerizing temperatures.

4. A composition consisting of a drying oil and a relatively small amount of iodine trichloride, characterized by its rapid rate of polymerization when heated to polymerizing temperatures.

5. The process of heat-bodying drying oils comprising adding an iodine halide in an amount not greater than about five parts per thousand by weight of oil, heating the mixture until the desired thickening has been attained, and then cooling the resulting oil.

6. The process of heat-bodying drying oils comprising adding iodine bromide in an amount not greater than about five parts per thousand by weight of oil, heating the mixture until the desired thickening has been attained, and then cooling the resulting oil.

7. The process of heat-bodying drying oils comprising adding iodine monochloride in an amount not greater than about five parts per thousand by weight of oil, heating the mixture until the desired thickening has been attained, and then cooling the resulting oil.

8. The process of heat-bodying drying oils comprising adding iodine trichloride in an amount not greater than about five parts per thousand by weight of oil, heating the mixture until the desired thickening has been attained, and then cooling the resulting oil.

EDWARD A. LASHER.